United States Patent [19]

Maddock

[11] 4,180,978

[45] Jan. 1, 1980

[54] TORQUE CONVERTER

[75] Inventor: Don G. Maddock, Ypsilanti, Mich.

[73] Assignee: General Motors Corporation, Detroit, Mich.

[21] Appl. No.: 950,595

[22] Filed: Oct. 12, 1978

[51] Int. Cl.² .............................................. F16D 33/20
[52] U.S. Cl. ........................................ 60/345; 60/361; 60/362
[58] Field of Search ................. 60/327, 345, 361, 362, 60/367

[56] References Cited

U.S. PATENT DOCUMENTS 2,306,758  12/1942  Schneider et al. .................... 60/361
2,963,867  12/1960  Amiard ................................. 60/345

Primary Examiner—Edgar W. Geoghegan
Attorney, Agent, or Firm—Donald F. Scherer

[57] ABSTRACT

A torque converter having an impeller incorporating blades having a negative outlet tip angle in the range of 20° to 30° to reduce the torque absorption capacity of the impeller at engine idle. The stator blades are set at a check angle in the range of 51° to 53° and have a sharp nose displaced circumferentially from the entrance flow of the stator thereby inducing fluid turbulence at the stator inlet during converter stall.

2 Claims, 3 Drawing Figures

U.S. Patent
Jan. 1, 1980
4,180,978
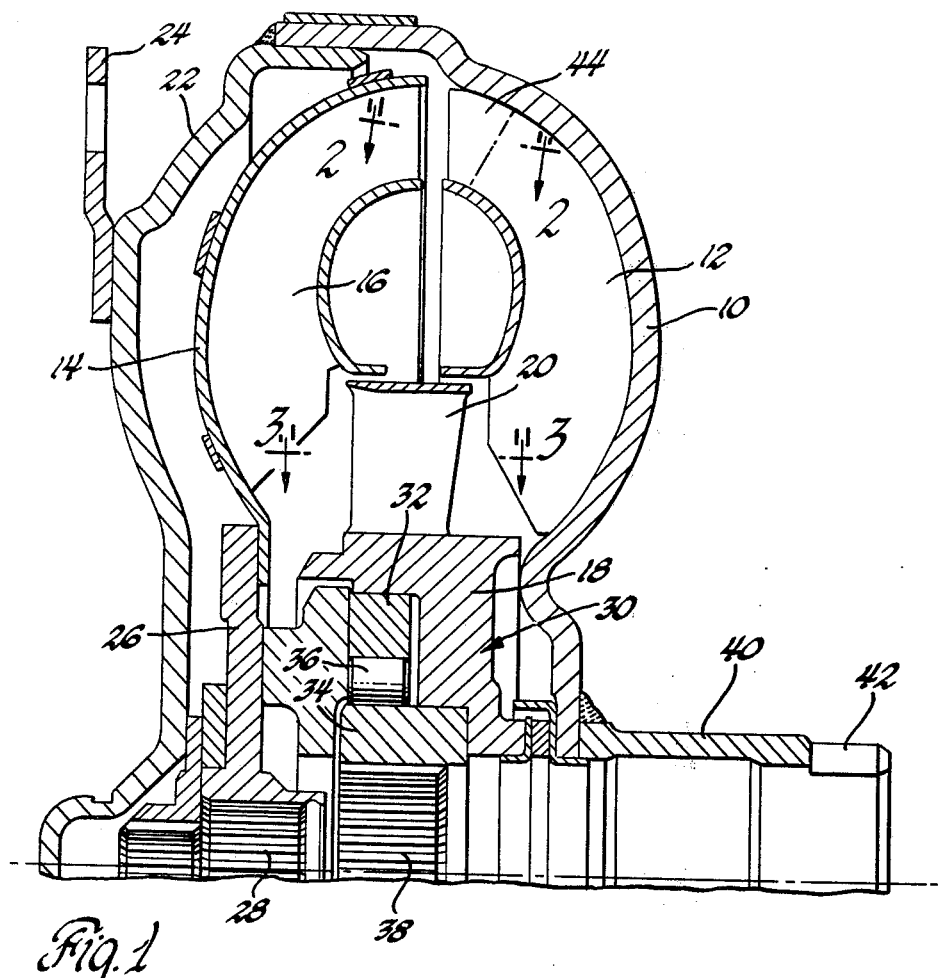
Fig.1
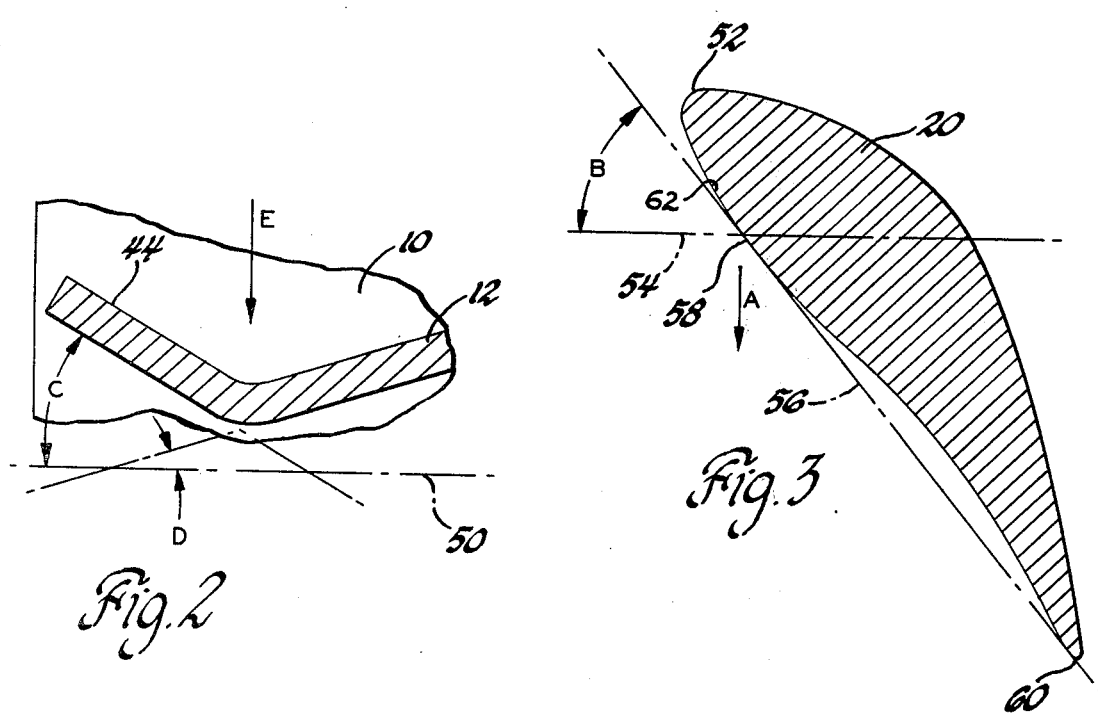
Fig.2
Fig.3

TORQUE CONVERTER

This invention relates to torque converters and more particularly to torque converters which reduce engine drive torque at idle speed.

The torque converter used in a passenger vehicle is known to have a significant effect on fuel economy. Since the torque converter must incur some slippage between the input and output elements thereof, several hydraulic phenomena occur within the fluid circulation which dissipate energy. Accordingly, the input power must be increased to accommodate the energy loss, resulting in higher fuel consumption.

Historically, the torque converter has been made "tighter" to increase the efficiency. The functional ramification of the "tighter" torque converter is that for any combination of pump speed and turbine speed, a higher pump torque will be absorbed. In terms of vehicle operation, a given combination of vehicle speed and acceleration will require a lower engine speed and will produce a higher converter efficiency. Therefore, from an economic standpoint, the "tightest" available torque converter is considered advantageous.

However, these "tight" torque converters do have significant drawbacks. Primarily, they result in higher engine drag torque at idle and limit engine speed during acceleration. The high idle drag torque is known to cause increased fuel consumption and is often associated with low speed spark knock, engine vibration and emission control problems. Additionally, "tight" converters have less torque ratio available over most of the normal range of vehicle speeds. The acceleration potential of the vehicle is limited by both this loss in torque ratio and the suppression of engine speed.

High performance vehicles, on the other hand, utilize a "loose" torque converter to achieve high torque ratio and engine speed throughout the converter range. In these vehicles, fuel economy is not a factor considered to be significant in the determination of converter performance.

The most prevalent manufacturing expediency used to increase the torque ratio within the torque converter is to produce the impeller blades with a severe negative exit angle. The negative exit angles of 55° and greater (SAE blade angle system A) have been used to increase the torque ratio. Another conventional practice for performance converters is the use of a high check angle for the stator blade. The check angle used for this purpose is consistently greater than 58°. This high check angle results in the extension of torque ratio to a higher speed at the expense of maximum torque ratio so that the severe negative impeller tip angle is necessary to regain the maximum torque ratio.

The present invention incorporates a moderate negative tip angle in the range of 20° to 30° and a moderate stator check angle in the range of 51° to 53°. This combination of blading has been found to be useful in providing a desirable torque ratio and an otherwise "tight" torque converter and to also reduce the idle drag torque within such torque converters.

It is therefore an object of this invention to provide an improved torque converter having a high stall capacity factor, thus affording a low idle drag torque.

Another object of this invention is to provide an improved torque converter having an impeller with a negative exit tip angle in the range of 20° to 30° and a sharp nose stator blade displaced circumferentially from the stator entrance flow and having a check angle in the range of 51° to 53° to provide a high stall capacity factor and reduced idle drag torque.

Other objects and advantages of this invention will be more apparent from the following description and drawings in which:

FIG. 1 is a sectional elevational view of a torque converter;

FIG. 2 is an enlarged view taken along line 2—2 of FIG. 1; and

FIG. 3 is an enlarged view of a stator blade taken along line 3—3 of FIG. 1.

The torque converter shown in FIG. 1 includes an impeller 10 having a plurality of blades 12, a turbine 14 having a plurality of blades 16 and a stator 18 having a plurality of blades 20. The blades 12, 16 and 20 are arranged to form a toroidal flow path as is well known in torque converter construction. The impeller 10 is secured to an input shell 22 adapted to be connected to an engine, not shown, by flanges 24. The turbine 14 further includes a hub 26 having a spline 28 formed thereon which is adapted to be drivingly connected to a converter output shaft, not shown. The stator 18 is operatively connected to a conventional one-way brake 30 having an outer race 32, an inner race 34 and a plurality of rollers 36. The inner race 34 has formed thereon a spline 38 adapted to be connected to a conventional stator shaft, not shown. The impeller 10 has a hub 40 with a drive slot 42 formed thereon, which drive slot 42 is adapted to drive a conventional hydraulic control pump in a well known manner.

The impeller blades 12 have the exit tip 44 bent to provide a negative angle C. The impeller blades 12 have an otherwise conventional form which would result in an exit angle designated D. The angles are measured in accordance with the SAE blade angle system A such that all angles are measured from a plane such as 50 which contains the converter axis and the blade tip being measured. Angles in the direction of rotation (Arrow E) are positive. The angle C is limited in the present invention to the range of −20° to −30° and preferably is set at −30°. A more conventional angle D is a +6°.

The stator blade 20, shown in FIG. 3, has a sharp nose 52 which is displaced from a plane 54 passing through the converter axis normal to the blade 20 in a direction away from the free rotational direction of the stator which is symbolized by Arrow A. The stator blades 20 have a check angle B determined by a plane 56 which is tangent to the stator blades 20 at points 58 and 60. The point 58 is found on the concave surface 62 and the point 60 is located at the exit tip of the stator blade. The angle B is formed by the intersection of planes 54 and 56. The displacement of the sharp nose 52 and the check angle B has significant effects on the performance of the torque converter. An increase in the check angle B causes an increase in the coupling speed and combines with the sharp nose to cause a decrease in stall torque ratio and increase in the stall input capacity factor. The input capacity factor is equal to pump speed ($N_p$) divided by the square root of pump torque ($T_p$): $[N_p/\sqrt{T_p}]$. Output capacity factor is equal to $N_t/\sqrt{T_t}$ where $N_t$ equals turbine speed and $T_t$ equals turbine torque. These stator blade features will also cause a slight reduction in efficiency during coupling operation. The negative tip angle C will cause an increase in the stall torque ratio, offsetting the decrease due to the stator blade configuration, and further reduces the stall capacity factor. The combination of moderate tip angle in the range of 20° to 30° and the stator check angle in the range of 51° to 53° has been found to increase the converter efficiency and to eliminate the downward cusp in the efficiency curve at the coupling point.

The stator blade configuration described above has a significant effect on reducing the drag torque at idle when compared to the more conventional bullet nose stators currently used in tight converters. A reduction in drag torque of course improves fuel economy.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in engine driven torque converters wherein the engine is operated through a range of speeds including an idle speed; said torque converter has a bladed fluid impeller driven by said engine and absorbing torque therefrom, a bladed turbine in fluid flow relation with said impeller, and a bladed stator for redirecting fluid from said turbine to said impeller arranged to produce a toroidal flow path of hydraulic fluid, said improvement comprising; said blades of said impeller having a negative tip angle displaced 30° from the toroidal flow path at the fluid outlet thereof effective to reduce torque absorption capacity of said impeller at idle speed, and said stator blades having a sharp nose displaced circumferentially and angularly from the entrance flow to the stator from said turbine to induce turbulence in the toroidal flow path at the stator inlet at stall speeds.

2. An improvement in engine driven torque converters wherein the engine is operated through a range of speeds including an idle speed; said torque converter has a bladed fluid impeller driven by said engine and absorbing torque therefrom, a bladed turbine in fluid relation with said impeller, and a bladed stator for redirecting fluid from said turbine to said impeller arranged to produce a toroidal flow path of hydraulic fluid, said improvement comprising; said blades of said impeller having a negative tip angle displaced in the range of 20° to 30° from the toroidal flow path at the fluid outlet thereof, and said stator blades having a sharp nose displaced circumferentially and angularly from the entrance flow to the stator from said turbine and a check angle in the range of 51° to 53° to induce turbulence in the toroidal flow path at the stator inlet at stall speeds to reduce idle drag torque and increase the stall capacity factor and maintain a desirable torque ratio.

* * * * *